United States Patent [19]

Ueno et al.

[11] Patent Number: 5,284,883
[45] Date of Patent: * Feb. 8, 1994

[54] MOLDING OF URETHANE RESIN COMPOSITION

[75] Inventors: Keiji Ueno, Osaka; Ikujiro Uda, Kanuma, both of Japan

[73] Assignee: Sumitomo Electric Industries, Inc., Osaka, Japan

[*] Notice: The portion of the term of this patent subsequent to Apr. 11, 2006 has been disclaimed.

[21] Appl. No.: 987,561

[22] Filed: Dec. 8, 1992

Related U.S. Application Data

[63] Continuation of Ser. No. 700,324, May 9, 1991, abandoned, which is a continuation of Ser. No. 262,041, Oct. 24, 1988, abandoned, which is a continuation of Ser. No. 903,525, Sep. 4, 1986, abandoned.

[30] Foreign Application Priority Data

Sep. 4, 1985 [JP] Japan .................. 60-196318
Oct. 17, 1985 [JP] Japan .................. 60-232461
Oct. 17, 1985 [JP] Japan .................. 60-232462

[51] Int. Cl.$^5$ .......................................... C08F 283/00
[52] U.S. Cl. ............................... 522/79; 522/81; 522/142; 525/454; 525/455; 525/920; 428/383; 428/379; 428/374
[58] Field of Search ............ 522/96, 81, 83, 79, 522/142; 525/455, 454, 920; 428/383, 379, 374

[56] References Cited

U.S. PATENT DOCUMENTS

| | | | |
|---|---|---|---|
| 3,168,417 | 2/1965 | Smith et al. | 428/383 |
| 3,174,950 | 3/1965 | Cordier | 524/590 |
| 3,245,960 | 4/1966 | Curtis | 428/379 |
| 3,396,210 | 8/1968 | McKillip et al. | |
| 3,624,045 | 11/1971 | Stivers | 525/440 |
| 3,951,657 | 4/1976 | Recchia et al. | |
| 4,065,587 | 12/1977 | Ting | 525/920 |
| 4,397,974 | 8/1983 | Goyert et al. | |
| 4,408,023 | 10/1983 | Gould et al. | |
| 4,454,309 | 6/1984 | Gould et al. | 525/454 |
| 4,533,598 | 8/1985 | Downey et al. | 428/379 |
| 4,820,782 | 4/1989 | Ueno | 525/454 |

FOREIGN PATENT DOCUMENTS 3412002 12/1985 Fed. Rep. of Germany .

*Primary Examiner*—Ralph H. Dean
*Attorney, Agent, or Firm*—Sughrue, Mion, Zinn, Macpeak & Seas

[57] ABSTRACT

A radiation crosslinked molding of a urethane resin composition comprising a thermoplastic urethane resing having incorporated therein a polyfunctional monomer selected from the group consisting of trimethylolpropane triacrylate, trimethylolpropane trimethacrylate and triacrylformal., is disclosed. The molding according to the present invention has excellent resistance to hot water and heat.

7 Claims, 1 Drawing Sheet

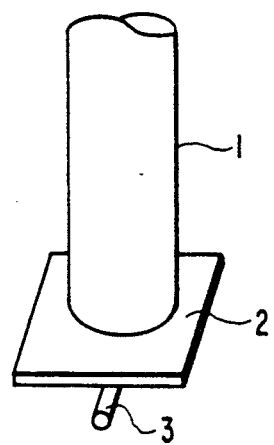

MOLDING OF URETHANE RESIN COMPOSITION

This is a continuation of application Ser. No. 07/700,324, filed on May 9, 1991 now abandoned which is a continuation of application Ser. No. 07/262,041 filed on Oct. 24, 1988, now abandoned which is a continuation of application Ser. No. 06/903,525 filed on Sep. 4, 1986, now abandoned.

FIELD OF THE INVENTION

The present invention relates to a radiation crosslinked molding of a urethane resin composition having improved resistance to hot water and heat.

BACKGROUND OF THE INVENTION

Thermoplastic urethane resins have superior mechanical strength and wear resistance on account of which these resins find many uses such as for hoses, belts, coatings for electric wires, pipes, shoe soles and various other moldings. However, urethane resins have easily hydrolyzable ester urethane bonds and are not suitable for use in areas where they are exposed to moisture for a prolonged period of time or in applications where steam or hot water is used. Efforts are being made to improve the resistance of water of urethane resins by using polyols having ether bonds [e.g., poly(1,4-oxybutylene)glycol], or caprolactam-based polyols (e.g., ε-lactone ester polymers instead of the aliphatic esters having easily hydrolyzable ester bonds. However, the inherent problem of hydrolysis still exists in urethane resins. A further problem with urethane resins is that they melt at temperatures of 180° C. or higher and cannot be used in applications where they are exposed to high temperatures as 150° C. or above, such as in the operation of dipping electric wires in a solder bath, without causing deformation of the resin coat.

With the rapid increase in the use of NC controlled machine tools, the field in which materials having high mechanical strength (e.g., high wear resistance) are used is expanding and the development of urethane resins having high resistance to heat and hot water has been sought.

From the view point of preventing fire and other disasters, the requirements for flame retardancy are becoming increasingly strict and there is a great need to offer a molding of a urethane resin composition, such as a coated electric wire, that is flame-retardant and exhibits superior resistance to water and heat.

One conventional method for improving the resistance to heat of high-molecular weight materials is to crosslink individual polymer molecules as is frequently practiced with polyethylenes. Crosslinking is commonly achieved by chemical crosslinking with organic peroxides, by radiation crosslinking with electron beams or gamma rays, or by water crosslinking with a reactive silane. However, chemical crosslinking and water crosslinking are unsuitable for thermoplastic urethane resins because the temperature for molding is at least 180° C., which is higher than the decomposition temperature of organic peroxides, and the addition of a reactive silane is uncontrollable.

The common technique for effecting radiation crosslinking is to add reactive polyfunctional monomers, to thereby cause accelerated crosslinking. It is generally held that a higher crosslinking efficiency is attained by polyfunctional monomers that have many functional groups and have a low molecular weight of monomers per functional group. Polyfunctional groups that are commonly employed include diacrylates such as diethylene glycol diacrylate; dimethacrylates such as ethylene glycol dimethacrylate; triacrylates such as trimethylolethane triacrylate and trimethylolpropane triacrylate; trimethacrylates such as trimethylolethane trimethacrylate and trimethylolpropane trimethacrylate; as well as triallyl cyanurate, triallyl isocyanurate, diallyl phthalate, trimethylmethacryl isocyanurate, trimethylacryl cyanurate, trimethylacryl isocyanurate and triacrylformal.

The present inventors added these polyfunctional monomers to thermoplastic urethane resins and studied their effectiveness in radiation crosslinking. To their great surprise, the urethane resin compositions having incorporated therein polyfunctional monomers other than trimethylolpropane trimethacrylate, trimethylolpropane triacrylate, and triacrylformal experienced total deformation in a thermal deformation test conducted at 180° C.

It is well known by, for example, U.S. Pat. No. 3,624,045 that to the thermoplastic urethane resin, N,N'-methylene-bis-acrylamide or N,N'-hexamethylene-bis-maleimide is added as a polyfunctional monomer, followed by effecting the radiation crosslinking. Although these polyfunctional monomers are an effective crosslinking monomer, urethane resins crosslinked with such a polyfunctional monomer are greater in terms of reduction in strength in hot water at 100° C. than those crosslinked with trimethylolpropane trimethacrylate, trimethylolpropane triacrylate, or triacrylformal and, therefore, the use of such polyfunctional monomers is not suited for attaining the object of the present invention.

Several of the polyfunctional monomers tested had the following molecular weights per functional group: 112.6 for trimethylolpropane trimethacrylate (molecular weight: 338), 98.7 for trimethylolpropane triacrylate (molecular weight: 296), 83 for triacrylformal (molecular weight: 249), and 83 for each of triallyl cyanurate and triallyl isocyanurate (molecular weight: 249). In consideration of the generally held view about the reltionship between the number of moles of a functional group and the degree of crosslinking, triallyl cyanurate would be expected to achieve a higher degree of crosslinking than trimethylolpropane trimethacrylate added in the same amount. Accordingly, there was much reason to expect that urethane resin compositions having incorporated therein triallyl cyanurate and triallyl isocyanurate would experience less deformation at 180° C., than those tested after incorporation of trimethylolpropane trimethacrylate, trimethylolpropane triacrylate and triacrylformal. Curiously enough, however, the improvement in resistance to thermal deformation which was attainable by radiation crosslinking was observed only with the urethane resin compositions having incorporated therein trimethylolpropane trimethacrylate, trimethylolpropane triacrylate, or triacrylformal.

A hot water test which was subsequently conducted at 100° C. showed that the urethane resin compositions that had been radiation crosslinked suffered from a smaller decrease in tensile strength than non-crosslinked urethane resins.

SUMMARY OF THE INVENTION

The present invention has been accomplished on the basis of these findings, and a principal object of the invention is to solve the aforementioned problems of the prior art by a radiation crosslinked molding of a urethane resin composition comprising a thermoplastic urethane resin having incorporated therein a polyfunctional monomer selected from the group consisting of trimethylolpropane triacrylate, trimethylolpropane trimethacrylate and triacrylformal. The urethane resin composition of the present invention having trimethylolpropane trimethacrylate, trimethylolpropane triacrylate or triacrylformal incorporated therein retains high strength and elongation even if it is aged in hot water at 100° C.

BRIEF DESCRIPTION OF THE DRAWING

The FIGURE is a sketch of an apparatus for conducting a thermal deformation test, wherein 1 is a metal rod (9.5 mm$^\phi$), 2 is a urethane resin coating layer, and 3 is a metal rod (1 mm$^\phi$).

DETAILED DESCRIPTION OF THE INVENTION

In a preferable embodiment, the composition of the present invention contains 0.1 to 50 parts by weight of the polyfunctional monomer based on 100 parts by weight of the thermoplastic urethane resin. If less than 0.1 part by weight of the polyfunctional monomer is used based on 100 parts by weight of the thermoplastic urethane resin, the addition of the polyfunctional monomer is insufficient to ensure complete radiation crosslinking. If the amount of the polyfunctional monomer exceeds 50 parts by weight, the resulting composition will experience a considerable drop in mechanical strength.

The dose of radiations to which the urethane resin composition is exposed varies depending on the amount of the polyfunctional monomer added and is preferably at least 3 Mrad and not more than 50 Mrad. Exposure in a dose of 3 Mrad or more is particularly effective for attaining the desired degree of crosslinking in that the composition will undergo minimal deformation in a thermal deformation test conducted at 180° C. No great drop in mechanical strength will occur if the dose of radiations is not more than 50 Mrad. The radiations which may be used as a crosslinking initiator consist of either electron beams or gamma rays.

If flame retardancy is particularly required for the urethane resin composition, it preferably contains two additional components, i.e., decabromodiphenyl ether and antimony trioxide. Decabromodiphenyl ether is the most resistant to water of all the halogen compounds known today. Antimony trioxide, when combined with halogen compounds, serves to provide significantly enhanced flame retardancy.

The following examples are provided for the purpose of further illustrating the present invention but should in no sense be taken as limiting.

EXAMPLES 1 TO 4

A thermoplastic urethane resin (Elastollan E 385 PNAT of Nippon Elastollan Industries Ltd.) was blended by employing 180° C.-hot rolls with one of the polyfunctional monomers shown in Table 1 in the amount indicated in the same table. The blend was compression molded into 1 mm-thick sheets of a test sample by applying a pressure for 10 minutes with a 180° C.-hot press. Thereafter, the sheets were exposed to electrom beams (2 MeV) in doses of 2.5, 5 and 15 Mrad. The exposed sheets were set in the apparatus shown in the FIGURE and, while being given a load of 0.5 kg, they were subjected to preheating for 10 minutes and pressed for 10 minutes. The resulting deformation of each test sample was calculated by the following equation:

$$\text{Percentage of deformation} = \frac{\text{(initial thickness of the sample)} - \text{(thickness after 10-min pressurization)}}{\text{initial thickness of the sample}} \times 100$$

The samples that were exposed to electron beams in a dose of 15 Mrad in Examples 1, 2 and 4 were aged for 3 or 7 days in hot water (100° C.) and subsequently tested to check for changes in tensile strength. The test samples were blanked with dumbbells (No. 3, JIS) and set in an Instron tester for testing at a tensile speed of 500 m/min. The results of the thermal deformation test and the tensile test are shown in Table 1.

COMPARATIVE EXAMPLES A TO C

Additional test sheets were prepared as in Examples 1 to 4 in accordance with the formulations shown in Table 1. Apart from those prepared in Comparative Example C, the sheets were exposed to electron beams (2 MeV) in doses of 2.5, 5 and 15 Mrad. A thermal deformation test and a hot water aging test were subsequently conducted as in Examples 1 to 4, except that the only sheets that were given an exposure in a dose of 15 Mrad were subjected to the hot water aging test.

EXAMPLES 5 TO 7

A thermoplastic urethane resin (Elastollan E385 PNAT of Nippon Elastollan Industries Ltd.) was blended by employing 180° C.-hot rolls with one of the polyfunctional monomers shown in Table 1, plus a flame retardant (decabromodiphenyl ether, DBDP) and antimony trioxide in the amounts also indicated in Table 1. Each of the blends was compression molded into 1 mm-thick sheets of a test sample by applying a pressure for 10 minutes with a 180° C.-hot press as in Examples 1 to 4. Thereafter, the sheets were exposed to electron beams (2 MeV) in doses of 2.5 and 15 Mrad.

The percentage of deformation and the change in tensile strength were measured for each sample by the same methods as employed in Examples 1 to 4. The results are shown in Table 2. The flame retardancy of each test sample was evaluated by determining its oxygen index (JIS K 7201). The results are also shown in Table 2.

COMPARATIVE EXAMPLES D TO F

A thermoplastic flame-retardant resin (Elastollan E585 FUOO, the trade name of Nippon Elastollan Industries Ltd. for a caprolactam-based polyurethane) was blended by employing 180° C.-hot rolls with one or more of the components shown in Table 2 in the amounts also indicated in the same table. The blend was compression molded into 1 mm-thick sheets of a test sample by applying a pressure for 10 minutes with a 180° C.-hot press. Thereafter, the sheets were exposed to electron beams (2 MeV) in doses of 2.5 and 15 Mrad. A thermal deformation test, measurements of oxygen index and a hot water aging test were conducted as in Examples 5 to 7. The results are shown in Table 2. The samples prepared in Comparative Examples D and E became too brittle in 7 days of aging in the hot water test to be subjected to a tensile test. The sheets prepared in Comparative Example F were not capable of being crosslinked.

EXAMPLES 8 TO 10

Each of the urethane resin compositions having the formulations indicated for Examples 5, 6 and 7 in Table 2 was extruded for an outer diameter of 7 mm over a strand (2.5 mm$^\phi$) of three polyethylene resin-coated conductors, and exposed to electron beams (2 MeV) in doses of 2.5 or 15 Mrad.

Each of the urethane resin coats was subjected to a horizontal burning test in accordance with the JASO specifications. The results are shown in Table 3.

COMPARATIVE EXAMPLES G TO I

Urethane resin-coated electric wires were fabricated as in Examples 8 to 10 using the urethane resin compositions having the formulations indicated for Comparative Examples D to F in Table 2. After being given an exposure to electron beams (2 MeV) in a dose of 2.5 or 15 Mrad, the urethane resin coats were subjected to a horizontal burning test as in Examples 8 to 10. The results are also shown in Table 3.

TABLE 1

|  | Example | | | | Comparative Example | | |
|---|---|---|---|---|---|---|---|
|  | 1 | 2 | 3 | 4 | A | B | C |
| Urethane Resin (parts) | 100 | 100 | 100 | 100 | 100 | 100 | 100 |
| 1)TAF (parts) | 5 | | | | | | |
| 2)TMPTM (parts) | | 5 | 10 | | | | |
| 3)TMPTA (parts) | | | | 5 | | | |
| 4)TAIC (parts) | | | | | 5 | | |
| 5)TAC (parts) | | | | | | 5 | |
| Heat Deformation (%) | | | | | | | |
| unirradiated | 100 | 100 | 100 | 100 | 100 | 100 | 100 |
| 2.5 Mrad | 100 | 100 | 100 | 100 | 100 | 100 | — |
| 5.0 Mrad | 76.6 | 70.4 | 62.4 | 65.7 | 100 | 100 | — |
| 15.0 Mrad | 69.3 | 50.0 | 34.3 | 53.7 | 100 | 100 | — |
| Change in Strength (%) during immersion in hot water (100° C.) | | | | | | | |
| initial | 100 | 100 | 100 | 100 | 100 | 100 | 100 |
| 3 days | 96.1 | 81.2 | — | 75.3 | 51.2 | 46.4 | 41.1 |
| 7 days | 96.7 | 76.4 | — | 67.2 | 54.0 | 45.9 | 34.7 |

1)TAF: triacrylformal
2)TMPTM: trimethylolpropane trimethacrylate
3)TMPTA: trimethylolpropane triacrylate
4)TAC: triallyl cyanurate

TABLE 2

|  | Example | | | Comparative Example | | |
|---|---|---|---|---|---|---|
|  | 5 | 6 | 7 | D | E | F |
| Urethane Resin (non-flame-retardant) (parts) | 100 | 100 | 100 | | | 100 |
| Urethane Resin (flame-retardant) (parts) | | | | 100 | 100 | |
| 1)TAF (parts) | 5 | | | 5 | | |
| 2)TMPTM (parts) | | 5 | | | 5 | |
| 3)TMPTA (parts) | | | 5 | | | |
| 4)TAIC (parts) | | | | | | 5 |
| 5)DBDP (parts) | 30 | 30 | 30 | | | 30 |
| Antimony Trioxide (parts) | 10 | 10 | 10 | | | 10 |
| Heat Deformation (%) | | | | | | |
| unirradiated | 100 | 100 | 100 | 100 | 100 | 100 |
| 2.5 Mrad | 100 | 100 | 100 | 100 | 100 | 100 |
| 15.0 Mrad | 55 | 63 | 70 | 48 | 61 | 100 |
| Oxygen Index (15 Mrad) | 30.0 | 30.0 | 30.0 | 30.5 | 30.0 | 30.0 |
| Change in Strength (%) during Immersion in Hot Water (100° C.) | | | | | | |
| initial | 100 | 100 | 100 | 100 | 100 | 100 |
| 7 days | 79.1 | 94.0 | 67.2 | broken | broken | 43.6 |
| 14 days | 62.7 | 73.9 | 50.5 | broken | broken | 33.0 |

1)TAF: triacrylformal
2)TMPTM: trimethylolpropane trimethacrylate
3)TMPTA: trimethylolpropane triacrylate
4)TAIC: triallyl isocyanurate
5)DBDP: decabromodiphenyl ether

TABLE 3

|  | Example | | | Comparative Example | | |
|---|---|---|---|---|---|---|
|  | 8 | 9 | 10 | G | H | I |
| horizontal burning time (second) | 3 | 2 | 3 | 1 | 2 | 3 |

While the invention has been described in detail and with reference to specific embodiments thereof, it will be apparent to one skilled in the art that various changes and modifications can be made therein without departing from the spirit and scope thereof.

What is claimed is:

1. A water resistant radiation crosslinked molding of a urethane resin composition comprising a thermoplastic urethane resin having incorporated therein a polyfunctional monomer selected from the group consisting of trimethylolpropane triacrylate, trimethylolpropane trimethacrylate and triacrylformal.

2. A water resistant radiation crosslinked molding of a urethane resin composition according to claim 1, wherein said polyfunctional monomer is present in an amount ranging from 0.1 to 50 parts by weight based on 100 parts by weight of the thermoplastic urethane resin.

3. A water resistant radiation crosslinked molding of a urethane resin composition according to claim 1, wherein the radiation is carried out with electron beams or gamma rays which have been given in a total dose of from 3 to 50 Mrad.

4. A water resistant radiation crosslinked molding of a urethane resin composition according to claim 1, wherein said urethane resin composition further contains decabromodiphenyl ether and antimony trioxide.

5. A water resistant radiation crosslinked molding of a urethane resin composition comprising a thermoplastic urethane resin having incorporated therein a polyfunctional monomer selected from the group consisting of trimethylolpropane triacrylate, trimethylolpropane trimethacrylate and triacrylformal, which molding is an electric wire having a coating layer of said urethane resin composition formed over a conductor.

6. A water resistant radiation crosslinked molding of a urethane resin composition according to claim 5, wherein said conductor is composed of two or more insulated conductors which are twisted in a strand form.

7. A water resistant radiation crosslinked molding of a urethane resin composition comprising a thermoplastic urethane resin having incorporated therein a polyfunctional monomer selected from the group consisting of trimethylolpropane triacrylate, trimethylolpropane trimethacrylate and triacrylformal, wherein said molding is capable of withstanding a thermal deformation test of 180° C. without substantially deforming.

* * * * *